United States Patent
Liu et al.

(10) Patent No.: US 9,851,773 B1
(45) Date of Patent: *Dec. 26, 2017

(54) AUTOMATIC CONFIGURATION OF POWER SETTINGS

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/420,421

(22) Filed: Jan. 31, 2017

Related U.S. Application Data

(63) Continuation of application No. 15/252,280, filed on Aug. 31, 2016.

(51) Int. Cl.
*H04B 1/38* (2015.01)
*G06F 1/32* (2006.01)
*G06F 9/44* (2006.01)

(52) U.S. Cl.
CPC .......... *G06F 1/3218* (2013.01); *G06F 9/4411* (2013.01)

(58) Field of Classification Search
CPC .......... H04W 52/0264; H04W 52/027; H04W 52/0261
USPC .......... 455/574, 343.2, 343.5, 127.1, 127.5
See application file for complete search history.

(56) References Cited

U.S. PATENT DOCUMENTS

| | | | |
|---|---|---|---|
| 8,135,443 B2 | 3/2012 | Aleksic et al. | |
| 8,280,456 B2 * | 10/2012 | Hackborn | G06F 11/3409 |
| | | | 348/189 |
| 8,352,767 B2 | 1/2013 | Zhang et al. | |
| 8,423,092 B2 | 4/2013 | Caskey | |
| 8,539,256 B2 * | 9/2013 | Barsness | G06F 1/3203 |
| | | | 713/300 |
| 8,555,100 B2 | 10/2013 | Liao | |
| 8,706,652 B2 | 4/2014 | Yang et al. | |
| 8,843,774 B2 | 9/2014 | Chen et al. | |

(Continued)

FOREIGN PATENT DOCUMENTS

| | | |
|---|---|---|
| EP | 2051157 | 4/2009 |
| WO | 2010132275 | 11/2010 |
| WO | 2013079913 | 6/2013 |

OTHER PUBLICATIONS

Dong et al., Chameleon: A Color-Adaptive Web Browser for Mobile OLED Displays, Technical Report 2010, Rice University.

(Continued)

*Primary Examiner* — Sonny Trinh
(74) *Attorney, Agent, or Firm* — Lieberman & Brandsdorfer, LLC

(57) ABSTRACT

Embodiments relate to a method for allocating resources and settings in order to optimize application satisfaction in view of hardware resources and adjustable software configurations. As applications are executed on a computing device, usage data is tracked, adjustable settings are identified, and power consumption of each application under different settings is measured. The usage data is then compiled, an optimal configuration setting is assessed for each application, and the setting is conveyed and applied to one or more applications.

5 Claims, 8 Drawing Sheets

(56) References Cited

U.S. PATENT DOCUMENTS

| | | | |
|---|---|---|---|
| 8,958,854 B1 | 2/2015 | Morley et al. | |
| 9,047,084 B2* | 6/2015 | Khawand | G06F 1/3203 |
| 9,118,520 B1* | 8/2015 | Mao | G06Q 10/04 |
| 9,247,502 B2* | 1/2016 | Xie | H04W 52/0261 |
| 9,385,557 B2* | 7/2016 | Causey | H02J 7/025 |
| 2008/0111698 A1 | 5/2008 | Atherton | |
| 2011/0124349 A1 | 5/2011 | Midtun et al. | |
| 2015/0019889 A1 | 1/2015 | Banerjee et al. | |
| 2016/0073351 A1* | 3/2016 | Cardozo | H04W 52/0258 455/574 |
| 2016/0366648 A1* | 12/2016 | Bostick | H04W 52/0261 |

OTHER PUBLICATIONS

LiKamWa et al., Moodscope: Building a Mood Sensor from Smartphone Usage Patterns, ModiSys '13, Jun. 25-28, 2013, Taipei, Taiwan.
List of IBM Patents or Applications Treated as Related, Jan. 2017.

* cited by examiner

AUTOMATIC CONFIGURATION OF POWER SETTINGS

CROSS-REFERENCE TO RELATED APPLICATION(S)

This application is a continuation patent application of U.S. patent application Ser. No. 15/252,280, filed Aug. 31, 2016, titled "Automatic Configuration of Power Settings", which is hereby incorporated by reference.

BACKGROUND

The present embodiments relate to power constraints associated with a portable computing platform. More specifically, the embodiments relate to automatic configuration of one or more activate applications embedded in the computer platform to optimize allocation of power and associated power management.

Battery life is a significant limiting factor in portable electronic devices such as "smart" phones, tablets, and laptop computers. In an effort to increase the span of battery life, technology has evolved to solve the problem from two perspectives, including the battery and the associated device. From the perspective of the battery, battery life is being increased with developing battery technology whereby batteries are being fabricated with more energy storage capacity and less physical footprint. From the perspective of the associated device, electronic devices are being developed to facilitate or enhance energy conservation and optimizations to address efficiency. Nevertheless, battery life remains a bottleneck in the electronic device industry.

In order to remedy the problem of limited battery life, several solutions are available. One can bring a backup battery or extended battery pack, but this is inconvenient and cumbersome as it requires the user to bring extra hardware or increase the physical footprint of the electronic device. Another solution is to set the electronic device to a power saving mode. Power saving mode extends the battery life of the device, but applies the same lower power settings across all running applications. Moreover, power saving mode is typically used when a low battery alert is communicated to the user, by which time it is already substantially late to commence a more efficient allocation of power. Another solution is avoiding running applications and programs that consume the most energy, but this limits the user experience to only certain applications.

SUMMARY

Embodiments include a method for automatically allocating resources and settings in order to optimize application satisfaction.

In one aspect, the method includes two or more applications operated on a computer device. Historical usage data is tracked, adjustable hardware settings are identified, and power consumption of each application is measured. The historical usage data is then compiled, an optimal configuration setting is assessed for each application, and the setting is conveyed to one or more application settings.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
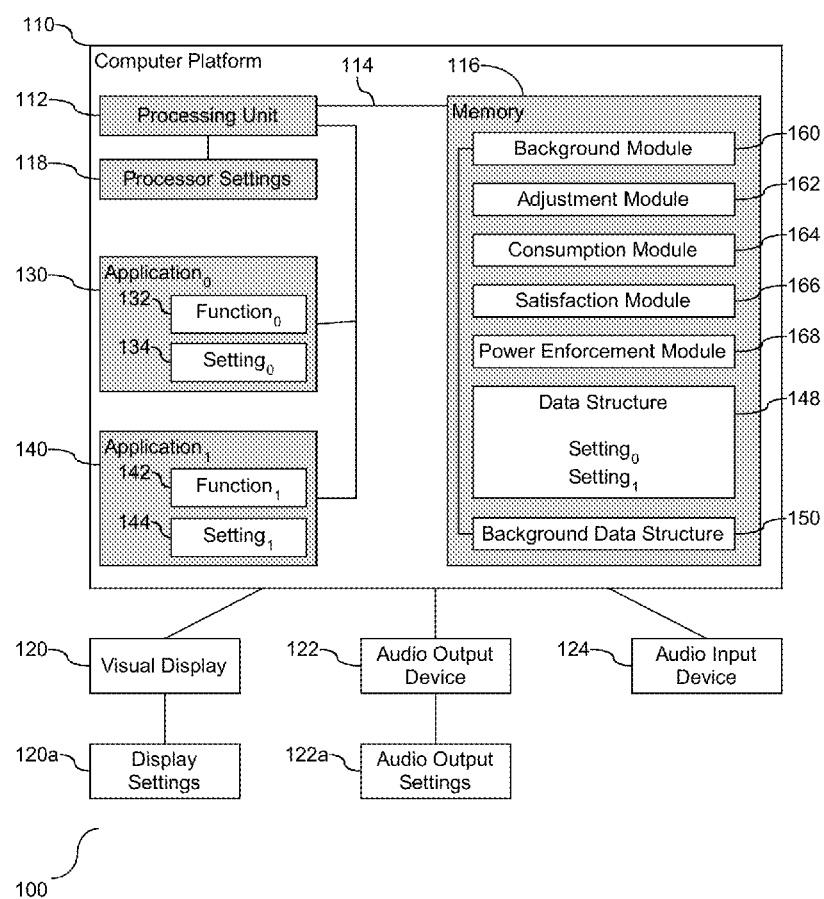
FIG. 1 depicts a block diagram illustrating a block diagram of a portable computer system.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Portable computing platforms come in different forms and structures, including tablet computers and smartphones. In general, these platforms are configured with a rechargeable battery to support operation of the platform. At the same time, these platforms are commonly configured with mobile applications, referred to herein as an App, that are a type of software designed to run on the platform. These Apps are designed with consideration for the demands and constraints of the associated device, and at the same time to utilize the capabilities of the mobile platform. For example, in one embodiment, the platform may include an embedded accelerometer, and a gaming App may be downloaded to utilize the functionality of the accelerometer to enhance the entertainment value of the App.

There are different categories of Apps available for the mobile computing platform. Examples of these categories include, but are not limited to, Web-based, native, and hybrid. A web based App refers to a program that is accessed over a network connection rather than within device memory. In other words, a web based App is only usable with an active network connection. A native App is a program that has been developed for use on a particular platform or device, and as such leverage one or more features of an associated operating system. A hybrid App is a program that combines elements of both the Web-based and native applications. In one embodiment, the hybrid App utilizes a consistent set of scripts or application program interfaces to access device capabilities. Regardless of the category of the application, all applications utilize specific hardware that comprises the computing platform, including the processing unit, memory, and battery power.

The battery is defined to hold a maximum amount of power. As the device is utilized, power is consumed. A charger may be employed to recharge the battery to extend the operating capabilities of the platform. There are different aspects of the platform that drain power from the batter, including the visual display, wireless communication components, processing unit utilization, cameras, sensors, and applications. Some of these aspects may even overlap. For example, in one embodiment, an application may utilize a significant amount of processing capability. In another embodiment, processing capability may be related to power consumption associated with a visual display. Apps are commonly developed without consideration for power consumption. As such, it is understood that settings on the associated platform may need to be adjusted to both support the Apps and to extend the life of the battery.

Satisfaction is a term used to define an act of fulfillment and/or gratification. With respect to the portable computing platform, satisfaction is extended to address a balance between preferred App settings and extension of battery power. More specifically, satisfaction pertains to optimizing adjustable graphics, audio, and power settings for each App with consideration of a preferred operation of the associated App(s) while accounting for battery power usage and remaining battery life.

Referring to FIG. 1, a block diagram (100) is provided of a portable computer system (110). As described above, the system may be in the form of a tablet or a smartphone, or in one embodiment an alternative computing platform. The system (110) is configured with a processing unit (112) in communication with memory (116) across a bus (114). The system is further configured with several additional hardware components, including, but not limited to a visual display (120), an audio output device (122), and an audio input device (124). Each of the hardware component (120)-(124) is operatively coupled to the processing unit (112). In one embodiment, the audio output device may be in the form of a speaker. Similarly, in one embodiment, the audio input device (124) may be in the form of a microphone. Additional hardware components may be embedded within the system (110), or attached to the system (110) as an auxiliary component.

As further illustrating, one or more program applications (130) and (140), respectively, are downloaded and configured to execute on the platform. Each of the applications (130) and (140) are operatively coupled to the processing unit (112), and when executed perform a function. More specifically, application (130), also referred to herein as a first application, is configured to perform a first function (132) and application (140), also referred to herein as a second application, is configured to perform a second function (142). Accordingly, the first and second applications (120) and (130) are examples of downloaded and installed applications.

Each installed application occupies data storage space. At the same time, execution or active use of an installed application utilizes both processing power and battery charge. The platform (110) may comprise various settings that are adjustable, with the adjustment affecting execution of an application and associated application usability. For example, in one embodiment, the adjustment may affect the brightness of the visual display (120), or the volume of the audio output (122). Similarly, in one embodiment, the adjustment may be a power saving feature that conserves battery usage thereby extended the usage of the platform. Other examples of a power saving adjustments may include throttling processor usage, turning off haptic feedback feature, disabling wireless activity, and managing background applications. Accordingly, one or more functional characteristics of the operation of the platform (110) may be subject to adjustment.

Each application may have an associated configuration with respect to power saving consideration. Similarly, execution of an application may address such settings, or in one embodiment disregard the settings. As shown, the first application (130) has an associated set of first settings (134), and the second application (140) has an associates set of second settings (144). The settings are generally specific to the associated application. In one embodiment, the settings may also take into consideration the time of day as well as presence or availability of other applications. Similarly, in one embodiment, the settings (134) and (144) may be separately configurable. Accordingly, each application has an associated set of settings to support execution of the application.

Each adjustable hardware component in the platform (110) includes an associated set of one or more settings subject to change. As described above, a visual display (120) may have an associated set of adjustable settings (120a), which in one embodiment may include modification of brightness. The processing unit (112) may have an associated set of adjustable processor settings (118). Audio output (122) may have an associated set of adjustable audio output settings (122a), such as decibel level adjustment. These described adjustable components are examples, and as such should not be considered limiting with respect to hardware elements of the platform that may be modified. Each adjustment may either conserve or increase power usage. The associated adjustment may be set for various reasons. For example, in one embodiment, the adjustments may be set to consume power but at the same time enhance functionality and/or satisfaction received from execution of one of the applications. Similarly, in one embodiment, the adjustments may be set to conserve power thereby providing minimal but acceptable functionality of the application while mitigating power consumption. The setting selection may be arbitrary, or in one embodiment, targeted.

Figures 2, 3:
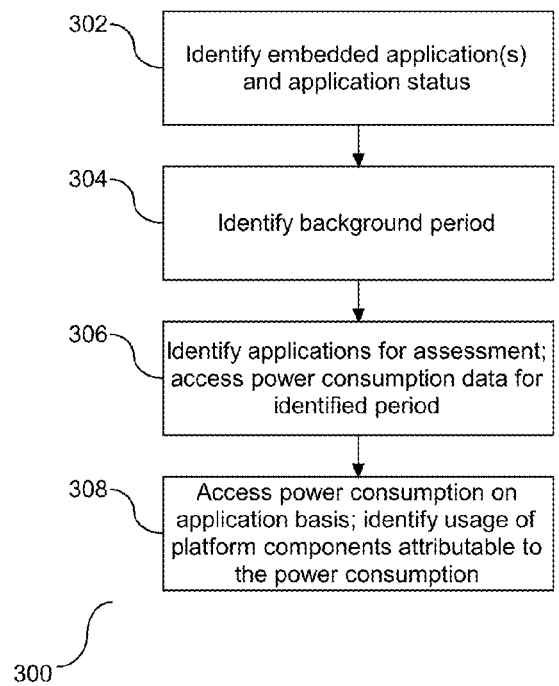
FIG. 2 depicts a block diagram illustrating a data structure demonstrating a selection of the settings.
FIG. 3 depicts a flow chart illustrating a flow chart illustrating functionality of the background module.

The application settings at (134) and (144) may be stored local to each application, or in one embodiment in a data structure (148) shown residing in memory (116). The data structure (148) defines a selection of settings for a plurality of situations. For example, in one embodiment, the selection of settings defined in the data structure may be power settings or a setting of a hardware or software component and the relationship of the setting to power consumption. More specifically, the data structure may include an array of values for each of the adjustable components with respect to execution of an application. Referring to FIG. 2, a data structure (200) is provided illustrating a selection of the settings. As shown, the data structure is particular to the application and the adjustable settings available on the platform. Three settings allowances shown herein include volume (210), brightness (220), and processing speed (230). In one embodiment, a different quantity of setting allowances may be defined, and as such, the quantity shown herein should not be considered limiting. Similarly, in one embodiment, a setting may be defined and stored in the data structure (200). A maximum setting (240) includes a maximum volume setting (242), a maximum brightness setting (244), and a maximum processor speed (246). An average setting (250) includes an average volume setting (252), an average brightness setting (254), and an average processor speed (256). Similarly, a minimum setting (260) includes a minimum volume setting (262), a minimum brightness setting (264), and a minimum processor speed (266). In one embodiment, the setting values may include a range of values. Accordingly, as shown herein, each application has defined or configurable settings for the adjustable components of the platform.

Referring to the platform (110), the application settings are dynamic and may be modified over time. For example, a preferred application setting may vary with respect to the remaining battery charge. In one embodiment, other factors may affect the application settings, including prior use of the application, time of day, overlap of application usage, etc. As shown, several modules are provided in the system to support dynamic modification of the settings adjustment, including a background module (160), an adjustment module (162), a consumption module (164), a satisfaction module (166), and a power enforcement module (168). Each of these modules provided different functions in support of the dynamic setting adjustment. As shown, each of the modules (160)-(168) resides in memory (116) and is operatively coupled to the processing unit (114). Output from the modules may come in various forms depending on the associated hardware that is physically adjusted, and App that may also be subject to adjustment. More specifically, output from the modules may include an optimal array of settings, including but not limited to power settings, and an adjustment of one or more of the settings if the current setting value(s) are different from the suggested setting value(s).

The background module (160) functions to track historical usage data. More specifically, the background module (160) is responsible for observing the execution and use of embedded applications (130) and (140), and associated settings, e.g. hardware and/or power settings, when the applications are active. In one embodiment, the background module (160) maintains an associated data structure (150) to facilitate tracking of usage data. In one embodiment, the background module (160) adjusts the setting values in the data structure (148) based on the historical tracking. In another embodiment, settings are automatically adjusted to a first setting configuration and a first user rating is obtained with respect to the automatic adjustment. The user rating may be a rating of the user's preference(s) of the setting configuration on a gradient scale. For example, the brightness of the screen is lowered to a lowest setting and the user is requested to provide a rating from 1 to 10, where 10 is most preferential and 1 is least preferential. After receiving the first user rating, the background module repeats the process for at least two additional setting configurations. The user ratings are subsequently compiled to form a data structure. The adjustments to the setting configurations for this process may be of one type of setting at a time or of multiple settings at a time.

The adjustment module (162) functions to identify adjustable settings on an application basis. As shown herein, the platform (110) may have an array of adjustable settings, and in one embodiment, different applications may have a subset of those components available for adjustment. For example, different applications and associated components may have adjustable settings that directly correlate to power consumption, and in one embodiment are referred to as power settings. The consumption module (164) functions to measure power consumption for each executing application. In one embodiment, the platform (110) may have two or more activate applications (130) and (140), with one application operating in the foreground and another application operating in the background, and both applications consuming power from the battery. The consumption module (164) measures application activity and associated power consumption. The satisfaction module (166) assesses an optimal settings configuration for each application, wherein the settings include adjustable configurations such as screen brightness, screen contrast, graphic definition, color settings, sound volume, haptic feedback, and software settings. Example software settings include, but are not limited to: levels of intelligence in a game application, browser setting such as rendering algorithms for an internet browsing application, or decoding setting for a music playing application. Specifically, the satisfaction module (166) may assess an optimal power configuration for each application, whether operating in the background or foreground. Operation of applications change over time. More specifically, applications may move from the background to the foreground, the foreground to the background, off, etc. As the application operation changes, the satisfaction module (166) conducts the configuration assessment for the subject application and any other embedded applications. The satisfaction module (166) conveys the configuration to one or more hardware components and different applications, and more specifically, the setting value for each of the associated hardware components and for each of the running applications. The power enforcement module (168) is provided to implement adjustment of one or more platform configurable settings for execution of a select application. Accordingly, the modules function to manage configuration of the platform, and to support and enable adjustment of one or more power configurations and their associated setting values.

Referring to FIG. 3, a flow chart (300) is provided illustrating functionality of the background module (160). As shown, each embedded application is identified (302). It is understood that an active application executing in the foreground consume power, but it is also understood that an application in the background may continue to consume power, even in the background. A historical assessment may be conducted on a periodic basis with a set or modifiable frequency. In the embodiment shown herein, the background period for the assessment is identified (304). The assessment period may be for any defined period on the basis of hour, day, week, month, quarter, year, etc. The assessment may take placed for the platform as a whole or on the basis for one or more specified applications. As shown in this example, a set of applications are identified for the assessment (306). In the embodiment with the assessment based on the platform, all of the embedded applications are selected. Based on the time period identified or selected at step (304) and the applications identified or selected at step (306), the power consumption of the platform is analyzed (308). More specifically, the analysis at step (308) assesses the power consumed on an application basis, including identification of usage of the platform components that are attributable to the power consumption. In one embodiment, the assessment at step (308) may include power attributable to the operating system. Similarly, in one embodiment, through the analysis at step (308), applications that consume significant power, e.g. the most power intensive applications, may be identified together with a fixed portion of the power consumed by these identified application(s). For example, the fixed power portion may be power attributable to the operating system kernel, and aspect of the platform that may not be adjusted without removing the application in its entirety. Accordingly, the background module analyzes prior power consumption usage, attribution of the consumption to adjustable and fixed platform components, and power consumption trends over a defined period of time.

Figure 4:
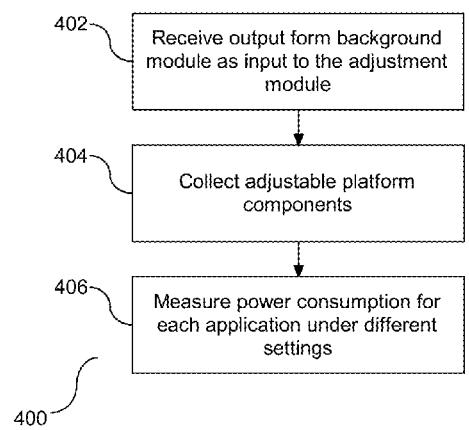
FIG. 4 depicts a flow chart illustrating functionality of the adjustment module.

Referring to FIG. 4, a flow chart (400) is provided illustrating functionality of the adjustment module. Output from the background module is received as input to the adjustment module (402). The adjustable platform components are collected (404). Examples of the collected components include, brightness, volume, processor frequency, responsiveness, smartness of an associated application, rendering method e.g. affect the appearance of the application, such as screen resolution, background of the screen, contrast, etc., and network connectivity, etc. Each adjustable component is a factor that contributes to platform power consumption on an application basis. Following step (404), power consumption is measured for each application under different settings (406). In one embodiment, data from the measurement(s) is employed to populate the data structure shown in FIG. 2.

The goal of the adjustment module is to measure power consumption of different applications subject to different settings. It is understood that the same application embedded on a different platform may exhibit different consumption trends. The following is pseudo code demonstrating a method of measuring power consumption of a single active application:
1. Adjust all n power settings on the platform to a configuration of desirable values, e.g. brightness to 8 (0-10), CPU to normal, vibration low, etc.
2. Run the application for a sufficient period of time so that measurement will be reasonable accurate after averaging.
3. Measure energy usage for the application.
4. Calculate average power consumed during the period.
5. Adjusted one or more settings.
6. Repeat steps 2-4 until all adjustable settings have been measured.

As demonstrated, the platform settings can be adjusted on an application basis. The power consumption measurement can be done manually, or in one embodiment may be the subject of an automated process. Accordingly, power consumption may be measured across multiple computing platforms on the basis of an application and adjustment of associated platform settings.

Figure 5:
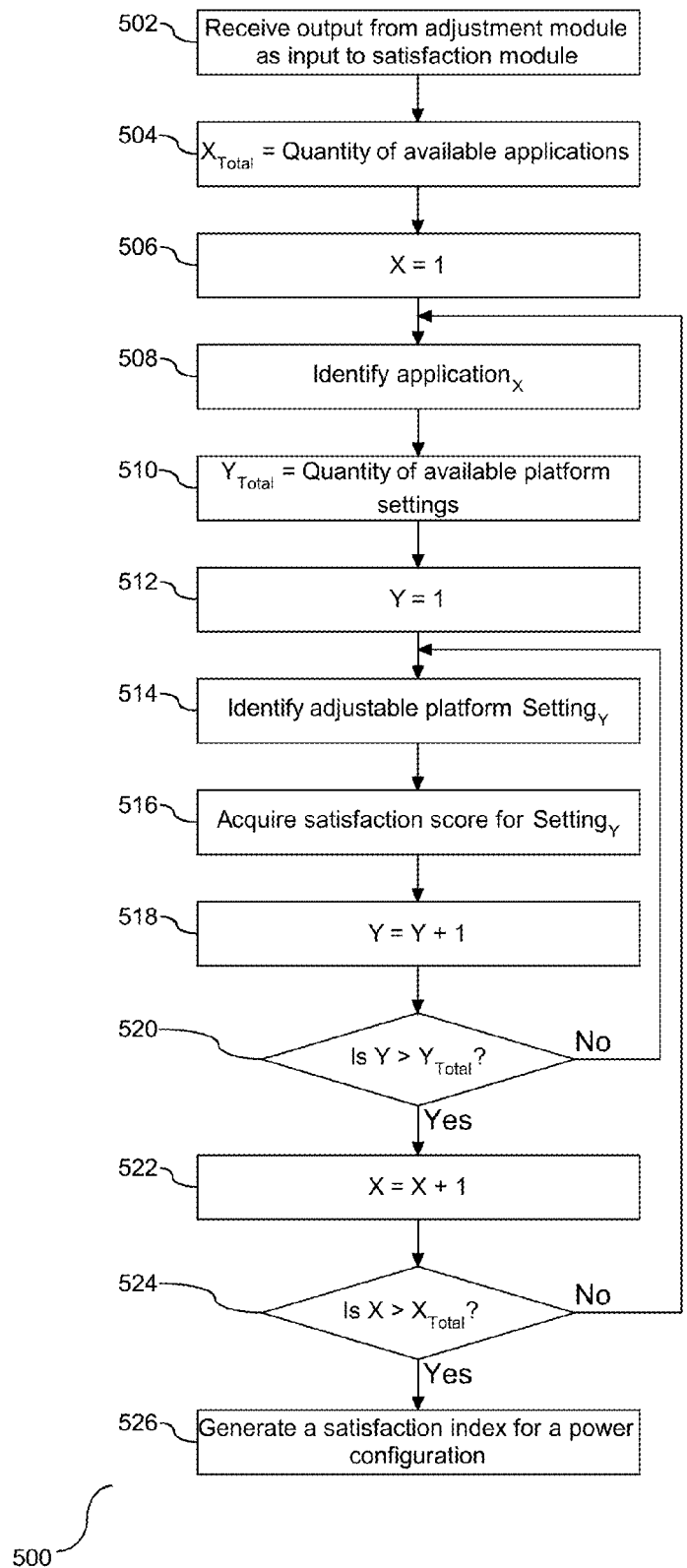
FIG. 5 depicts a flow chart illustrating a satisfaction module, and more specifically assessing satisfaction across the adjustable settings of the computing platform.

Referring to FIG. 5, a flow chart (500) is provided illustrating the satisfaction module, and more specifically assessing satisfaction across the adjustable settings of the computing platform. Output from the adjustment module is received as input to the satisfaction module (502). The satisfaction module demonstrated herein is assessed on the basis of an application. The variable $X_{Total}$ is assigned to the quantity of available applications (504), and an associated application counting variable, X, is initialized (506), and application$_X$ is identified (506). Similarly, the variable $Y_{Total}$ is assigned to the quantity of platform settings available (510), and a setting counting variable Y is initialized (512). An adjustable platform setting$_Y$ is identified (514) and a satisfaction score is acquired for the setting (516). In one embodiment, the satisfaction score is gathered based on the platform setting used for the application, and in one embodiment, the system presents a survey for manual entry of one or more satisfaction scores. Following step (516), the setting counting value is incremented (518) and it is determined if there are any further settings that have not been evaluated (520). A negative response to the determination at step (520) is followed by a return to step (514). Similarly, a positive response to the determination at step (520) is followed by an increment of the application counting variable (522). It is then determined if all of the applications have been evaluated (524). A negative response to the determination at step (520) is followed by a return to step (508), and a positive response concludes the application and setting evaluation with respect to satisfaction.

More specifically, the positive response at step (524) is followed by generating a satisfaction index for a power configuration (526). The following is a mathematical formula for generating the satisfaction index:

$$H(x_1, x_2, \ldots, x_n) = \prod_{j=1}^{n} \left( \frac{h_j(x_j)}{10} \right),$$

where $h_j(x_j)$ is a satisfaction value for power setting factor j. Accordingly, as demonstrated satisfaction is quantified for each adjustable setting in the platform across multiple applications.

Figure 6:
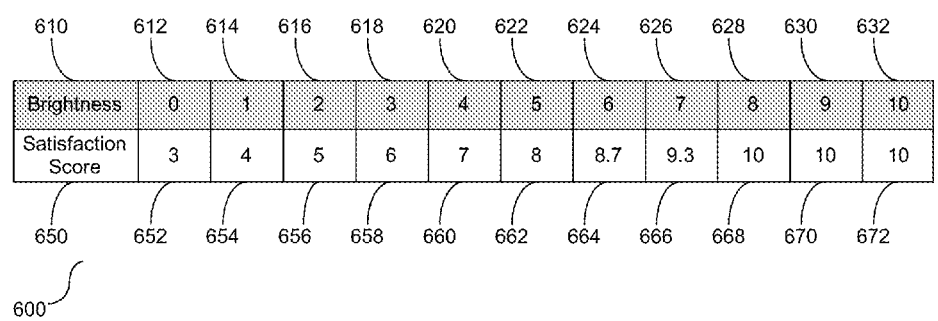
FIG. 6 depicts a block diagram illustrating an example data structure of a satisfaction index for the brightness setting across multiple applications.

Referring to FIG. 6, a block diagram (600) is provided illustrating an example data structure of the satisfaction index for the brightness setting across a specific application. As shown, the setting is identified as brightness (610), with an associated brightness scale ranging from zero (612) to ten (632). The scale represents the brightness settings available for the platform. The satisfaction values (650) represent a computed satisfaction score for the subject application at the identified brightness setting. In one embodiment, the satisfaction score for a power setting factor may be different for different applications. As shown, the satisfaction scores are represented at (652)-(672), with each score either directly or indirectly from a user's input or being a linear interpolation of satisfaction score based on user's input. In one embodiment, a separate satisfaction index is created for each of the platform adjustable settings.

Figure 7:
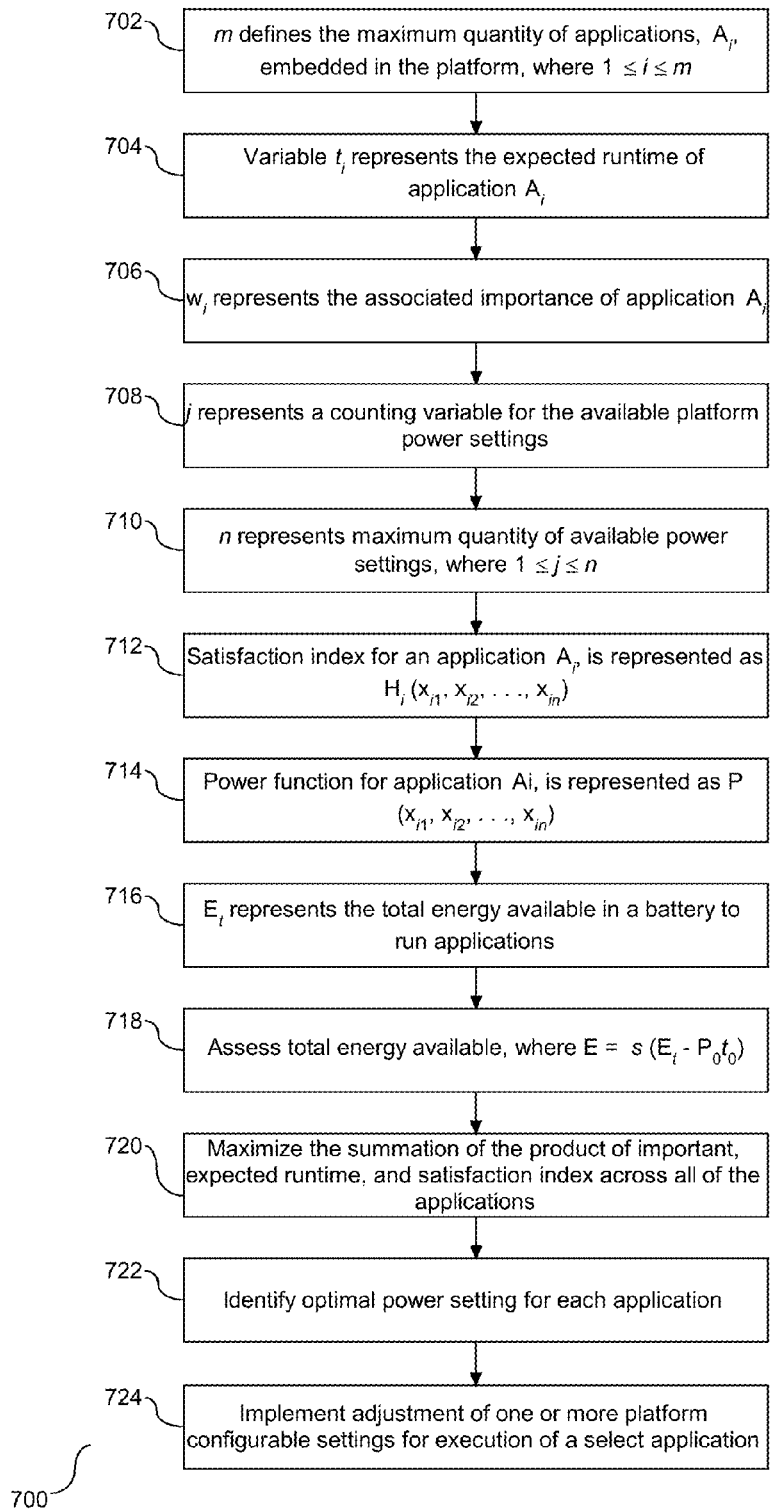
FIG. 7 depicts a flow chart illustrating a process for computing an optimal power setting, and utilizing the computation to adjust one or more settings of the computing platform.

The quantified satisfaction is employed to assess an optimal power setting for the embedded applications. Referring to FIG. 7, a flow chart (700) is provided illustrating a process for computing an optimal power setting, and utilizing the computation to adjust one or more settings on the computing platform. In the example shown, the settings subject to adjustment are power settings, although in one embodiment, the adjustable settings may be any hardware or software components that affect power consumption. The variable m defines the maximum quantity of applications, $A_i$, embedded in the platform (702) so that $1 \leq i \leq m$. The variable $t_i$ represents the expected runtime of application $A_i$ (704), and $w_i$ represents the associated importance of application $A_i$ (706). In one embodiment, the application importance is manually set or designated. The variable j represents a counting variable for the available platform power settings (708), with the maximum quantity of available power settings represented by n (710), so that $1 \le j \le n$. The satisfaction index for an application $A_i$, is represented as $H_i$ ($x_{i1}$), $x_{i2}$, ..., $x_{in}$) (712). Details of the satisfaction index are shown and described in FIG. 5. As shown in FIG. 3, power consumption is assessed for each application across a plurality of platform settings. The power function for application $A_i$, is represented as $P_i$ ($x_{i1}$, $x_2$, ..., $x_{in}$) (714), which is computed by consumption module (164).

It is understood that a battery can hold a finite quantity of charge. For each charge, the variable $E_t$ represents the total energy available in a battery to run applications (716), such as voice and text. The total available energy is assessed (718) as follows:

$$E = s(E_t - P_0 t_0)$$

where $P_o$ represents the fixed portion of power consumption which is obtained from the background module (160), $t_o$ represents the time projected for use of the platform before charging is required, and s represents a guard-band coefficient. In one embodiment, the guard-band coefficient may be manually modified. The objective is to maximize the summation of the product of importance, expected runtime, and satisfaction index across all of the applications, with the constraints being the summation of the product of the expected runtime and the power consumption across all of the application being less than or equal to the total energy available (720). In one embodiment, the problem expressed by the objective is formulated as follows:

Objective: $\max \Sigma_{i=1}^{m} w_i t_i H_i(x_{i1}, x_{i2}, \ldots, x_{in})$

Constraints: $\Sigma_{i=1}^{m} t_i P_i(x_{i1}, x_{i2}, \ldots, x_{in}) \le E$

Based on the solution of the expressed problem from step (720), the optimal power setting for each application is identified (722), i.e., the optimal values for $x_{ij}$ for $1 \le i \le m$, $1 \le j \le n$, and in one embodiment stored in a memory location. In one embodiment, the optimal power setting for an active application attains a maximum satisfaction setting for a primary application while satisfying minimal satisfaction of any background applications. A power enforcement module is provided to implement adjustment of one or more platform configurable settings for execution of a select application (724). More specifically, when a application is activated, the power setting configuration is applied to each application to maximize satisfaction, and the enforcement module functions to interface with an associated hardware component for any physical setting adjustments that are required.

As shown in the flow charts herein, an analysis is conducted to assess satisfaction of use of one or more applications in a computing platform and enforcement of the satisfaction within the physical constraints to the platform. It is understood that the processes shown and described in the flow charts may be executed on a local computing platform, such as a tablet or smartphone. Similarly, it is understood that the data assessment and computations may be executed on a shared resource, such as a cloud based resource, and accessible via a network connection to the shared resource.

Figure 8:
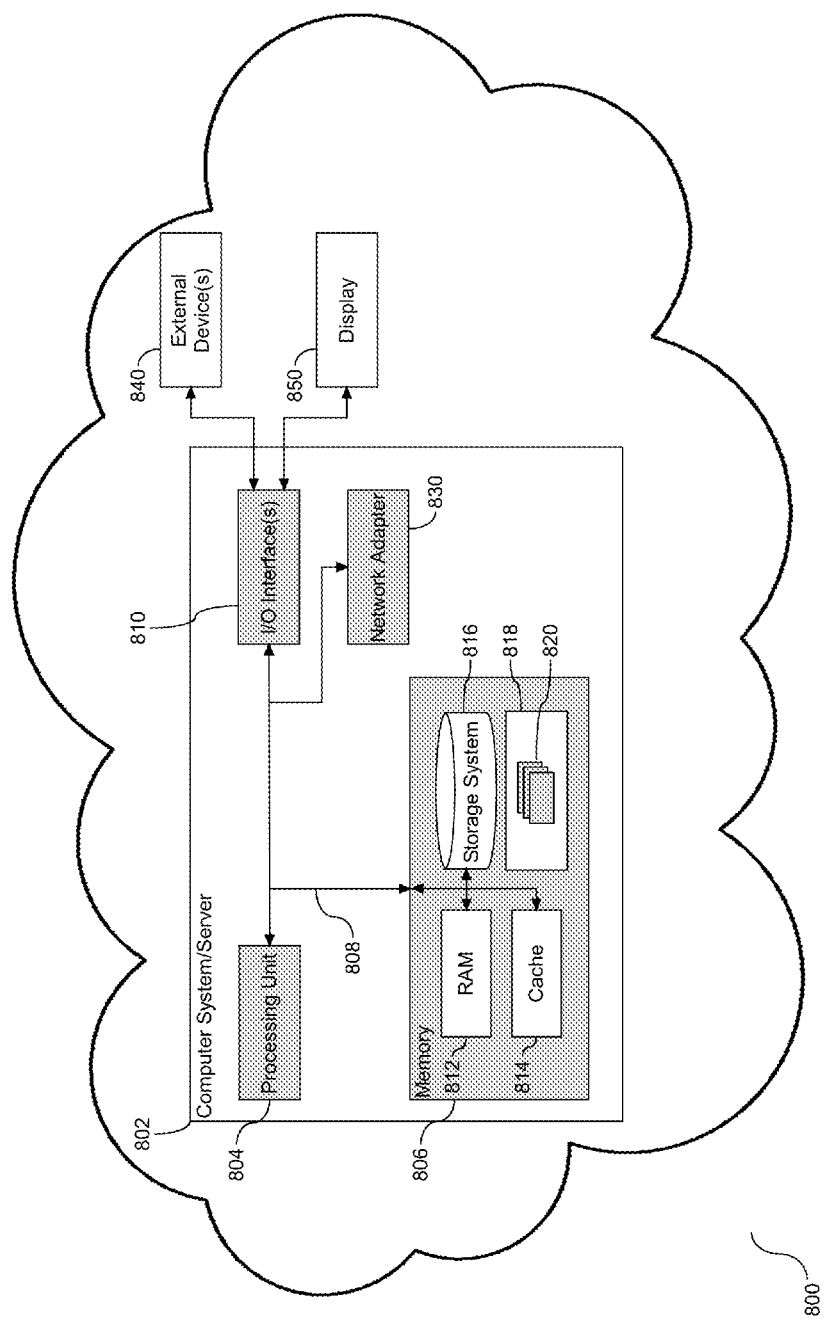
FIG. 8 depicts a schematic example of a system to implement the processes of FIGS. 3-5 and 7, and the system of FIG. 1.

With reference to FIG. 8, a block diagram (800) is provided illustrating an example of a computer system/server (802), hereinafter referred to as a host (802) of a cloud based support system, to implement the processes described above in the flow charts. Host (802) is operational with numerous other general purpose or special purpose computing system environments or configurations. Examples of well-known computing systems, environments, and/or configurations that may be suitable for use with host (802) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems or devices, and the like.

Host (802) may be described in the general context of computer system-executable instructions, such as program modules, being executed by a computer system. Generally, program modules may include routines, programs, objects, components, logic, data structures, and so on that perform particular tasks or implement particular abstract data types. Host (802) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, host (802) is shown in the form of a general-purpose computing device. The components of host (802) may include, but are not limited to, one or more processors or processing units (804), a system memory (806), and a bus (808) that couples various system components including system memory (806) to processor (804). Bus (808) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (802) typically includes a variety of computer system readable media. Such media may be any available media that is accessible by host (802) and it includes both volatile and non-volatile media, removable and non-removable media.

Memory (806) can include computer system readable media in the form of volatile memory, such as random access memory (RAM) (812) and/or cache memory (814). Host (802) further includes other removable/non-removable, volatile/non-volatile computer system storage media. By way of example only, storage system (816) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (808) by one or more data media interfaces.

Program/utility (818), having a set (at least one) of program modules (820), may be stored in memory (806) by way of example, and not limitation, as well as an operating system, one or more application programs, other program modules, and program data. Each of the operating systems, one or more application programs, other program modules, and program data or some combination thereof, may include an implementation of a networking environment. Program modules (820) generally carry out the functions and/or methodologies of embodiments of correlating application satisfaction with platform setting optimization as described herein. For example, the set of program modules (820) may include the modules configured to implement the satisfaction assessment process(es) described above with reference to FIG. 1.

Host (802) may also communicate with one or more external devices (840), such as a keyboard, a pointing device, etc.; a display (850); one or more devices that enable a user to interact with host (802); and/or any devices (e.g., network card, modem, etc.) that enable host (802) to communicate with one or more other computing devices. Such communication can occur via Input/Output (I/O) interface(s) (810). Still yet, host (802) can communicate with one or more networks such as a local area network (LAN), a general wide area network (WAN), and/or a public network (e.g., the Internet) via network adapter (830). As depicted, network adapter (830) communicates with the other components of host (802) via bus (808). In one embodiment, a plurality of nodes of a distributed file system (860) is in communication with the host (802) via the I/O interface (810) or via the network adapter (830). It should be understood that, although not shown, other hardware and/or software components could be used in conjunction with host (802). Examples include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (806), including RAM (812), cache (814), and storage system (816), such as a removable storage drive and a hard disk installed in a hard disk drive.

Computer programs (also called computer control logic) are stored in memory (806). Computer programs may also be received via a communication interface, such as network adapter (830). Such computer programs, when run, enable the computer system to perform the features of the present embodiments as discussed herein. In particular, the computer programs, when run, enable the processing unit (804) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (802) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Examples of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
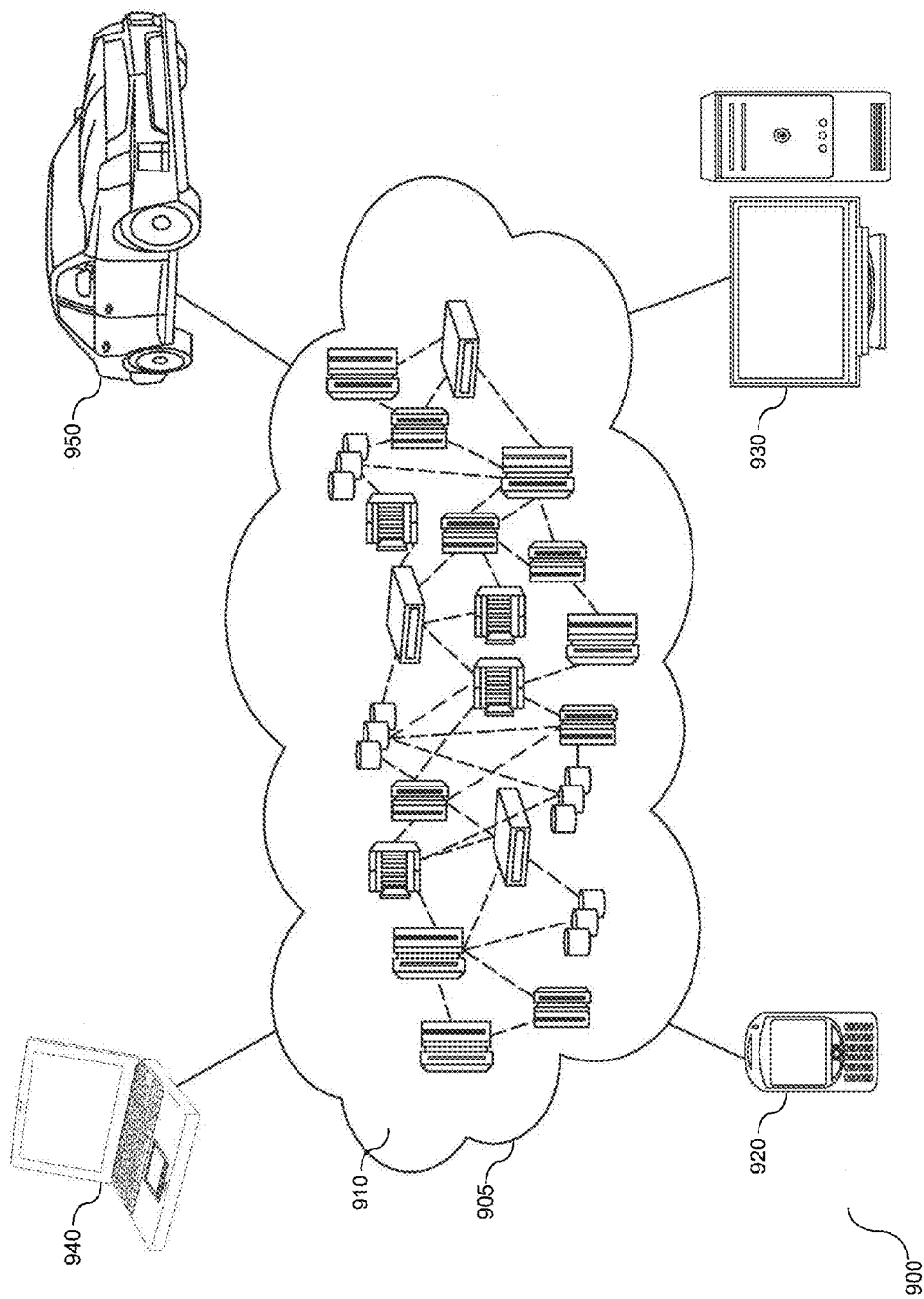
FIG. 9 depicts a block diagram illustrating a cloud computing environment.

Referring now to FIG. 9, an illustrative cloud computing network (900). As shown, cloud computing network (900) includes a cloud computing environment (905) having one or more cloud computing nodes (910) with which local computing devices used by cloud consumers may communicate. Examples of these local computing devices include, but are not limited to, personal digital assistant (PDA) or cellular telephone (920), desktop computer (930), laptop computer (940), and/or automobile computer system (950). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (920)-(950) shown in FIG. 9 are intended to be illustrative only and that the cloud computing environment (905) can communicate with any type of computerized device over any type of network and/or network addressable connection (e.g., using a web browser).

Figure 10:
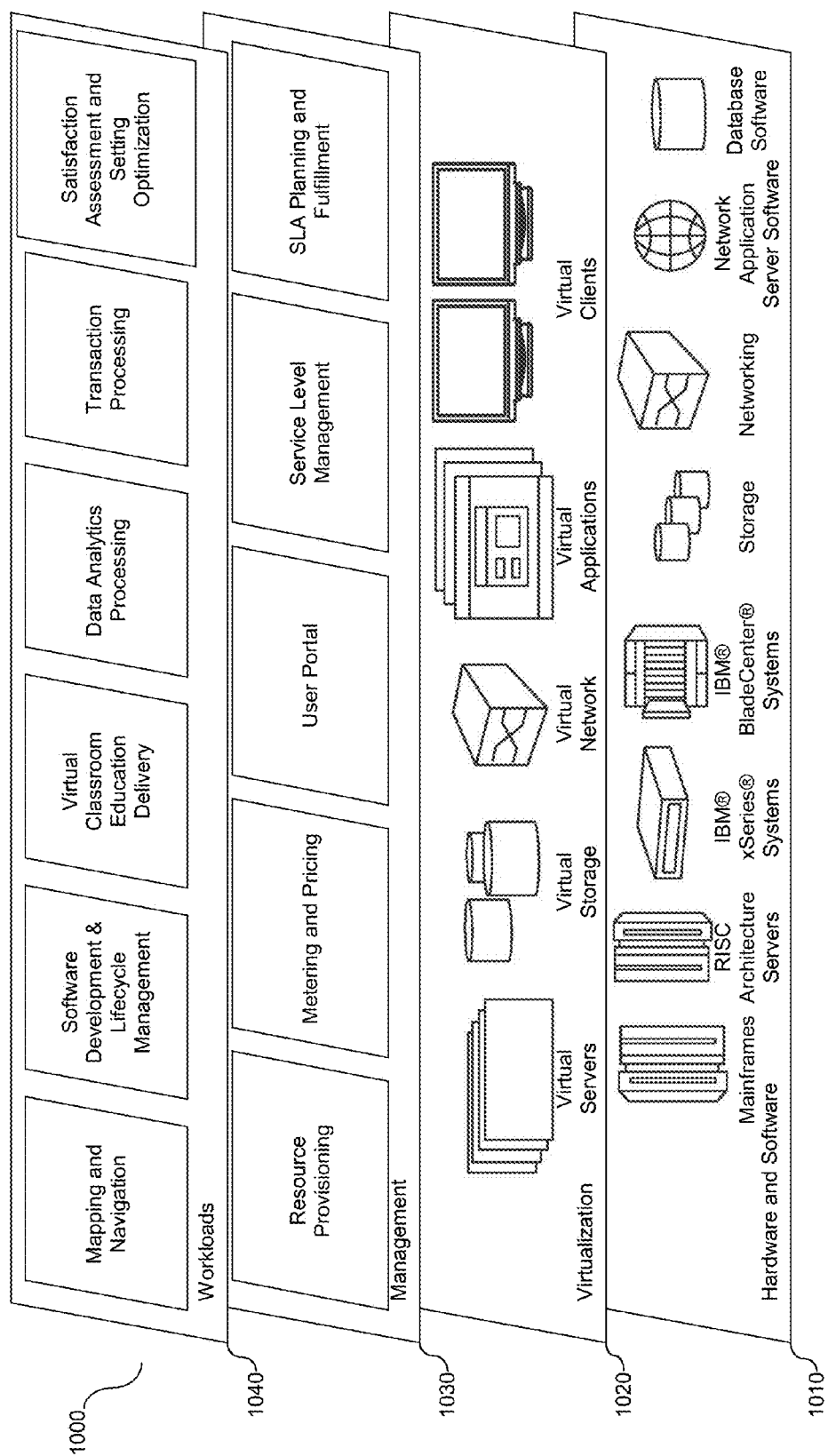
FIG. 10 depicts a block diagram illustrating a set of functional abstraction model layers provided by the cloud computing environment.

Referring now to FIG. 10, a set of functional abstraction layers provided by the cloud computing network of FIG. 9 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040). The hardware and software layer (1010) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In one example, management layer (1030) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and life-cycle management; virtual classroom education delivery; data analytics processing; transaction processing; and satisfaction assessment in support of setting optimization within the cloud computing environment.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. It is understood that the embodiments were chosen and described in order to best explain the principles and the practical application, and to enable others of ordinary skill in the art to understand the embodiments with various modifications as are suited to the particular use contemplated. Accordingly, the allocation of resources and settings in an electronic device are supported in order to optimize satisfaction.

It will be appreciated that, although specific embodiments have been described herein for purposes of illustration, various modifications may be made without departing from the spirit and scope. In one embodiment, the optimized satisfaction may be extended to include optimization of user satisfaction and an associated experience, including but not limited to being content or happy with the experience. Accordingly, the scope of protection of the embodiments is limited only by the following claims and their equivalents.

We claim:

1. A method comprising:
   operating two or more applications on a computer device;
   identifying adjustable settings;
   tracking historical usage data, including:
      observing execution and use of applications and associated settings; and
      adjusting one or more values of the associated settings based on the observation;
   measuring power consumption of each application;
   compiling historical usage data;
   assessing an optimal configuration setting for each application; and
   conveying the optimal configuration setting to one or more application settings.

2. The method of claim 1, wherein the tracking of historical usage data comprises:
   adjusting the adjustable settings to a first setting configuration;
   obtaining a first rating of the first setting configuration;
   adjusting the adjustable settings to a second setting configuration;
   obtaining a second rating of the second setting configuration; and
   compiling the first and second ratings in a hardware storage device.

3. The method of claim 1, further comprising:
   obtaining a fixed portion of power consumed by each application;
   estimating an expected run-time for each application; and
   modifying one or more adjustable settings responsive to the estimated run-time and fixed portion of power consumption.

4. The method of claim 3, further comprising detecting application satisfaction associated with each application based on the hardware setting modification, wherein the detected satisfaction is reflected in a configuration rating.

5. The method of claim 4, further comprising generating a satisfaction index as an interpolation of each application setting.

* * * * *